May 27, 1958
A. J. SALCH
2,836,079
SAFETY STEERING SHAFT
Filed July 30, 1956
4 Sheets-Sheet 1
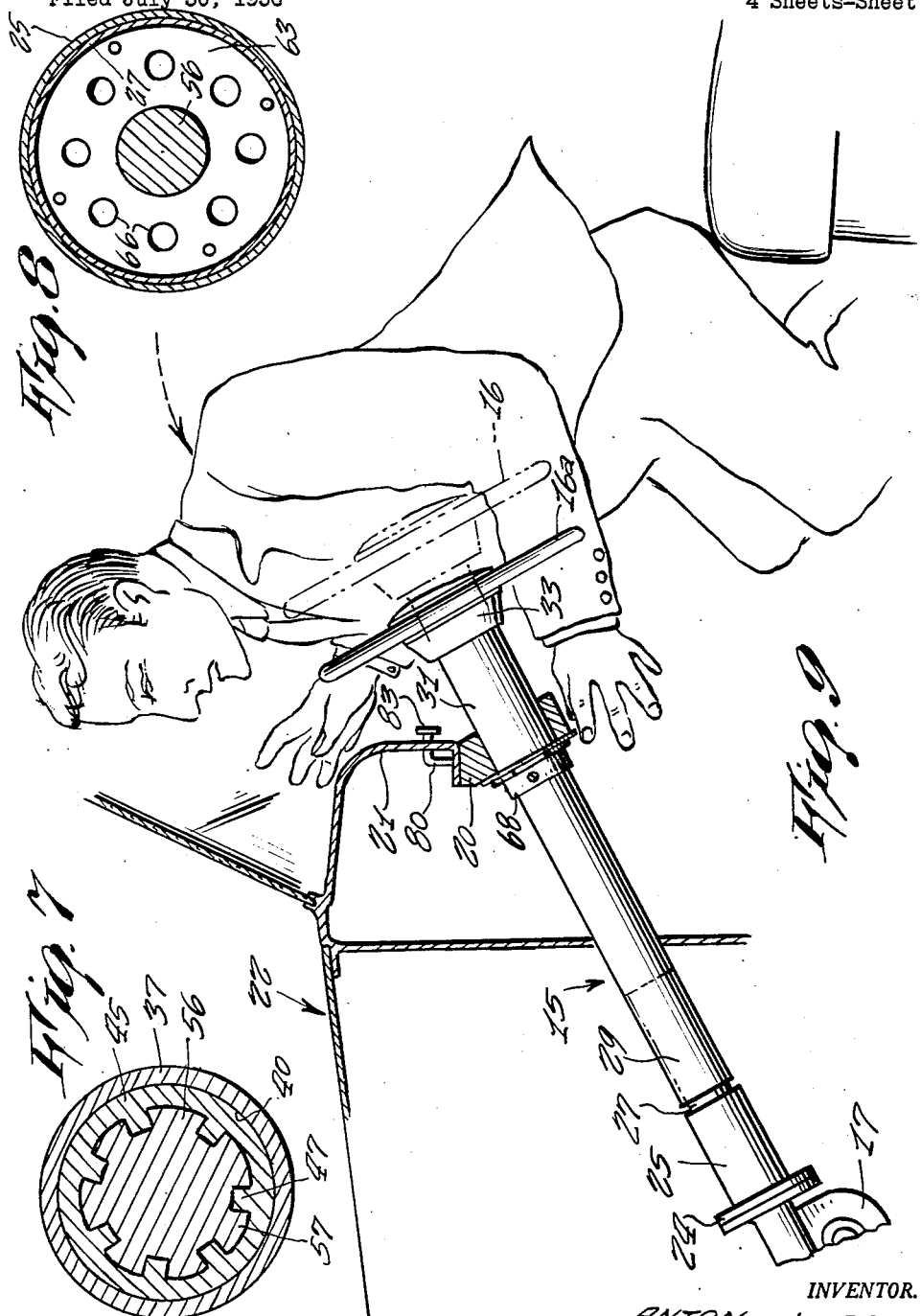
INVENTOR.
ANTON J. SALCH
BY
Carl Miller
ATTORNEY

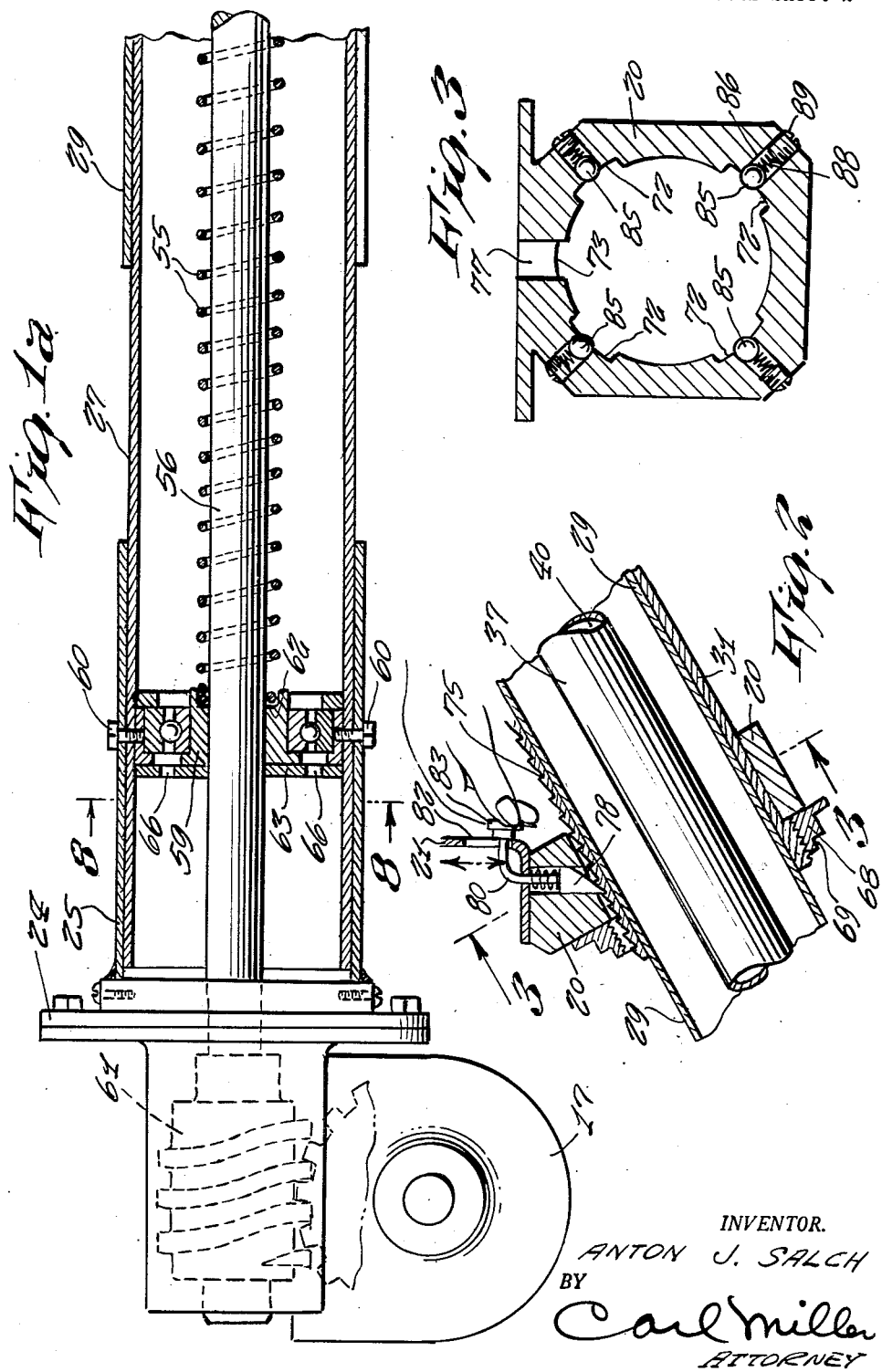

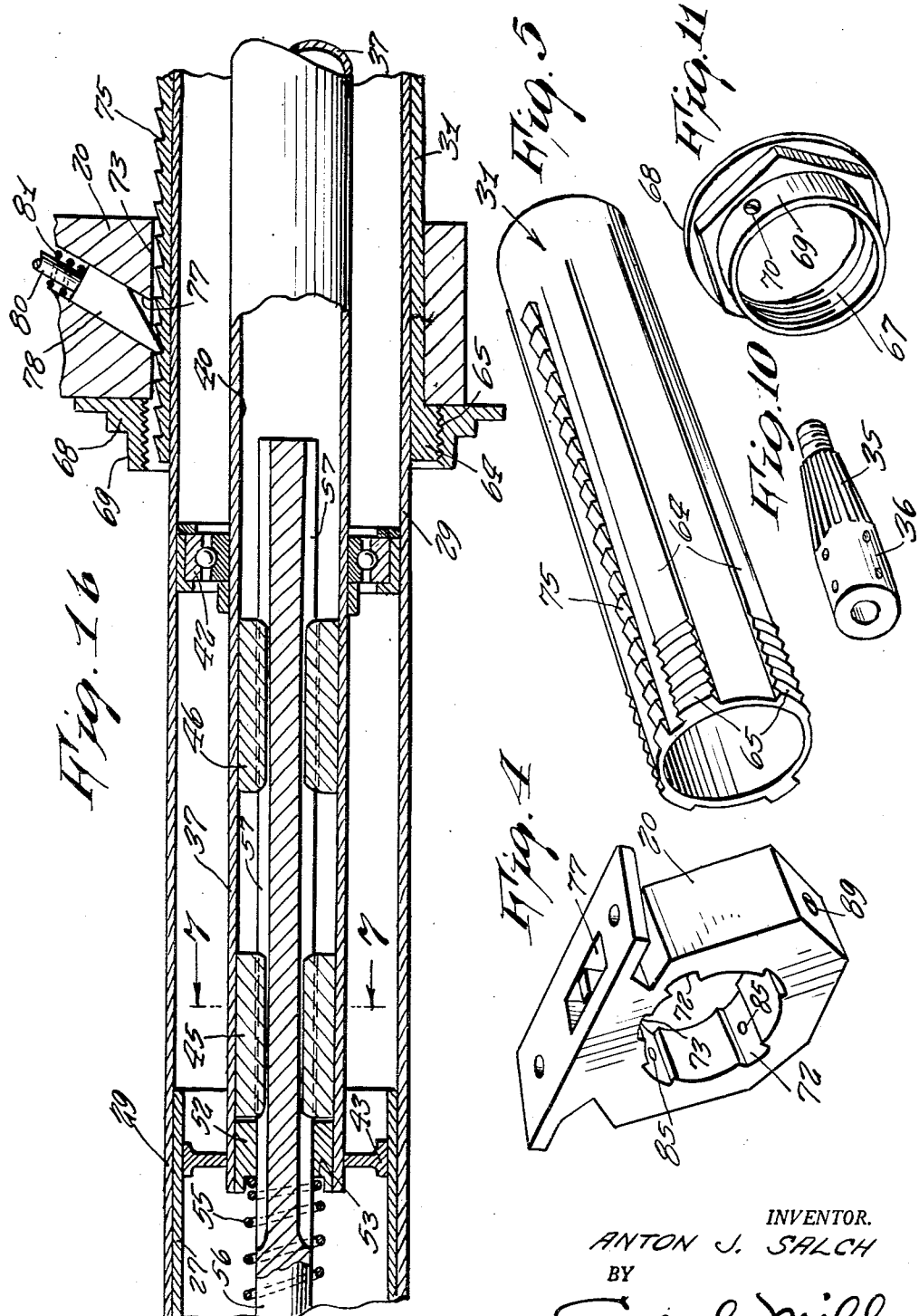

May 27, 1958 A. J. SALCH 2,836,079
SAFETY STEERING SHAFT
Filed July 30, 1956 4 Sheets-Sheet 4
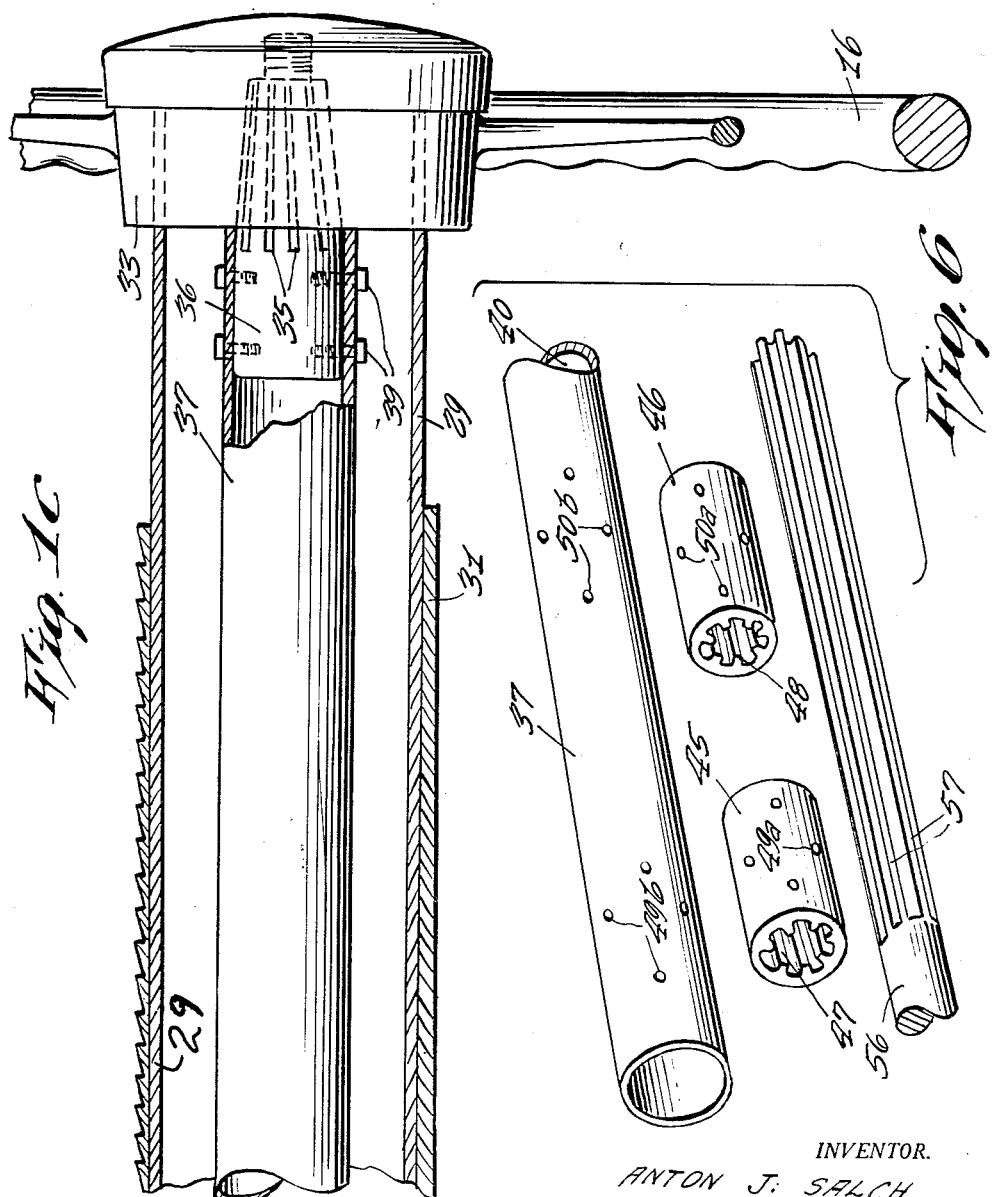
INVENTOR.
ANTON J. SALCH
BY
Carl Miller
ATTORNEY

United States Patent Office 2,836,079
Patented May 27, 1958

2,836,079
SAFETY STEERING SHAFT

Anton J. Salch, Jersey City, N. J.

Application July 30, 1956, Serial No. 601,076

3 Claims. (Cl. 74—493)

This invention relates to steering shaft assembly and, more particularly, to safety steering shaft assemblies for automotive vehicles.

Ordinarily, one of the greatest causes of injury to the driver of an automobile during an accident is the very rigid steering wheel assembly against which he is almost invariably thrown. Usually, when the vehicle collides with another object, the driver is thrown forwardly against the steering wheel and the steering shaft and, in some cases, the driver is practically impaled on the rigid shaft. An object of this invention, therefore, is to provide a safety steering wheel assembly for automotive vehicles that is simple in construction, efficient in operation, and which will overcome the aforementioned dangers.

Another object of this invention, is to provide a steering wheel assembly for vehicles that is longitudinally adjustable and which may be readily adjusted to more comfortably suit any particular driver.

Still another object of this invention, is to provide a steering wheel assembly for vehicles that may be retracted in response to an inwardly directed force at the steering wheel end thereof and which may be selectively held in any desired position by a releasable stop-it member.

All of the foregoing and still further objects and advantages of this invention will become apparent from a study of the following specification, taken in connection with the accompanying drawing, wherein:

Figures 1a, 1b, and 1c are longitudinal cross-sectional views of the lower extremity, the mid-portion, and the upper extremity, respectively, of a steering column assembly made in accordance with this invention;

Figure 2 is a fragmentary sectional view of a portion of the steering column in adjustable engagement with the vehicle support portions;

Figure 3 is a cross-sectional view taken along line 3—3 of Figure 2;

Figure 4 is a perspective view of the support block shown in Figure 3;

Figure 5 is a perspective view of an element of the steering column;

Figure 6 is an exploded perspective view of another sub-assembly of the steering column assembly;

Figure 7 is a cross-sectional view taken along line 7—7 of Figure 1b;

Figure 8 is a cross-sectional view taken along line 8—8 of Figure 1a;

Figure 9 is a perspective view showing the steering wheel and column assembly made in accordance with this invention in operative use in the vehicle; and Figure 10 is a perspective view of a connector block forming a part of this invention; and Figure 11 is a perspective view of an adjustable abutment plate forming a part of this invention.

Referring now to Figure 9 of the drawing, a safety drive shaft 15 made in accordance with this invention, is shown to be associated with worm drive gearing 17 at its lower end and has a steering wheel 16 at its upper extremity. The upper end of the steering column is maintained in proper position within the vehicle by means of a bearing block 20 that is secured beneath the dashboard 21 of the vehicle 22.

Referring now to Figures 1a, 1b, and 1c, the steering column is shown to include a lower outer tube flange 24 that is secured to the worm gearing of the front wheel steering mechanism. A lower outer tube 25 is rigidly secured to the flange 24 and is adapted to rigidly support an inwardly disposed tube 27 that extends upwardly and outwardly therefrom. The upper end of the inner tube 27 is adapted to slidably receive an upper outer tube 29 that has an upper sliding tube collar 31 rigidly secured thereto and which is in slidable engagement with the interior of the bearing block 20. The steering wheel 16 is secured to the upper outwardly extending end of the outer tube 29 by means of its connection thereto of the hub 33 of the steering wheel. A splined connector block 35 is adapted to be received within the interior central portion of the hub 33 at its upper end, and at its lower end is rigidly secured such as by bolts 39 within the longitudinal bore 40 of an upper hollow steering shaft 37. The steering shaft 37 extends downwardly through the interior of the steering column and is maintained concentric with the axis thereof by means of the ball bearing assembly 42 adjacent the mid-section thereof. The lower end of the steering shaft 37 is maintained in concentric relationship with the axis of the inner tube 27 by means of a webbed contact guide plate 43, as clearly shown in Figure 1b. As more clearly shown in Figure 6, the interior of the steering shaft 37 is provided with a pair of spaced splined torque blocks 45, 46 that have inwardly disposed splines 47, 48, and which are adapted to be rigidly attached to the shaft such as by spot-welds or bolts extending through the associated and aligned holes 49a, b, 50a, b, respectively. The lower inward end of the shaft 57 is also provided with a closure member that has a recess 53 that is adapted to provide a seat for the upper end of the longitudinally disposed compression spring that is seated at its lower end in a recess 62 that is disposed on the upper surface of a lower bearing assembly 59. The inwardly disposed splines 47, 48, of the assembled shaft 37 are adapted to receive similar splines 57 carried at the upper end of a lower drive shaft 56 that is maintained in concentric relationship with the lower end of the steering collar by means of the bearing assembly 59 which is rigidly secured to the outer tube 25 such as by screws 60.

The lower end of the lower drive shaft 56 carries a worm gear 61 that is in meshing engagement with a worm wheel of the steering assembly. In order to permit the passage of air through the respective portions of the steering column, the lower end of the bearing assembly 59 is provided with a breather plate having a plurality of breather holes 66 therein.

The upper end of the steering column is slidably supported within the bearing block 20 by means of its association with the upper sliding tube collar 31 that is provided with a plurality of equally spaced ridges 64 that extend longitudinally along its exterior surface. The lower end of the ridges are provided with a continuous thread 65 that are adapted to mesh with similar threads 67 of an adjustable abutment plate 68 that has a portion for receiving an adjusting wrench and a set screw 70 for locking the plate in a desired adjusted position, in a manner hereinafter described. As is more clearly shown in Figure 4, the interior of the bearing block 20 is provided with a circular opening having spaced recesses 72 that are adapted to slidably receive the raised threaded ridges 64 of the sliding collar 31. The block 20 is also provided with a centrally located and upwardly disposed recess 73 that is adapted to slidably receive the teeth of a rack type ratchet 75 carried on the collar 31. A downwardly extending opening 77 in the block 20 provides a guide means for a pawl 78 that is adapted to extend therethrough to engagement with the teeth of the ratchet 75. The pawl 78 is biased downwardly into engagement with the ratchet by means of a compression spring 81 that is seated at one end on the pawl and on the other end against the remaining portion of the vehicle as shown in Figure 2. An operating rod 80 extends upwardly through the bore 77 from the pawl 78 and outwardly through a slot 82 in the dashboard of the vehicle. The outer end of the rod 80 is provided with an actuating handle 83 that is adapted to raise the pawl 78 out of engagement with the ratchet against the action of the spring 81 in order to effect adjustment of the steering column. In order to provide a better guiding and bearing surface for the steering column, the bearing block 20 is provided with a plurality of inwardly disposed pawls 85 that communicate with the interior portions of the thread receiving recesses 72 of the block. These bores as shown in Figure 3, are biased inwardly of their respective bores 86 by means of compression springs that are maintained in compression therewith by means of a set screw 89.

In operation and use, as more clearly shown in Figure 9, in the event that the driver of the vehicle is thrown or thrust against the steering wheel 16 the force of impact moves the wheel from its extended position to a retracted or inwardly telescoped position 16a against the action of the longitudinally disposed compression spring 55. The inward movement of the column is checked by the pawls 78 which prevent the return of the steering column to its normal position after the pressure against the steering wheel has been released. This prevents a rebound of the steering column and more effectively cushions the shock. The steering column may be manually released so as to be withdrawn by raising the control rod 80 so that pawl 78 is drawn from engagement with the ratchet, whereupon the column will return to its normal position under the action of the compression spring 55. While this pawl and ratchet assembly provides a convenient means temporarily adjusting the position of the steering wheel relative to the driver's seat, more permanent adjustments may be made by loosening the set screw 70 of the adjustment plate 68 and threadingly adjusting the position of the collar 31 relative thereto and again tightening the set screw in the desired position. This adjustment retracts the upper end of the steering column and prevents the outward movement thereof because of the abutment of the plate 68 with the inwardly disposed surface of the bearing block, 20, as more clearly shown in Figure 2. Ordinarily, the ratchet and pawl assembly may be used to make temporary adjustments in the length of the steering column in normal use and, of course, acts as a safety device which reduces injury otherwise resulting from the driver being thrown against the steering wheel.

While this invention has been described with particular reference to the particular form shown on the drawing, it is to be understood that such is not to be construed as imparting limitations upon the invention, as best defined by the claims appended hereto.

Having thus described my invention, I claim as new and desire to secure by Letters Patent:

1. A collapsible steering column assembly for automotive vehicles adapted to transmit rotational movement from an upper manually operated steering wheel to a lower driven steering gear carried within a steering gear housing comprising, in combination, an outer longitudinally telescoped housing fixedly secured at one end to said steering gear housing and rotatably supported at the opposite end with respect to said steering wheel, an inner multi-section telescoping drive shaft having a lower section drivingly engaged with said steering gear and an upper section drivingly engaged with said steering wheel, block bearing means adapted to be secured to the vehicle structure for longitudinally slidably supporting said outer housing, adjustable abutment means secured to said outer housing in engagement with said block bearing means to limit the outward telescoping movement of said housing, said outer housing comprising ratchet means said block bearing comprising a spring biased pawl adapted to engage said ratchet means for permitting telescoping movement of said steering column toward the collapsed position and releasably preventing the return of said steering column toward an extended position, spring means normally resisting the movement of said outer housing and said upper and lower sections of said inner shaft toward a collapsed position, the lower section of said inner drive shaft comprising a splined portion at its upper extremity, said upper section comprising a hollow housing having a pair of spaced inwardly splined torque blocks secured adjacent to the lower end thereof and slidably receiving said lower section, whereby rotational movement is transmitted from said upper section to said lower section, the lower end of said upper section further comprising an outwardly extending webbed guide plate in rotatable engagement with the interior of said hollow housing for maintaining the axis of said inner drive shaft concentric with the axis of said housing, and a ball bearing assembly carried by said upper and lower sections of said inner drive shaft for further maintaining said concentric relationship between said inner drive shaft of said outer housing.

2. A collapsible steering column assembly as set forth in claim 1, wherein said spring means comprises a compression spring seated at a lower end on abutment means carried by said outer housing and at an upper end on abutment means carried by said upper end of said inner shaft.

3. A collapsible steering column assembly as set forth in claim 2, wherein said adjustable abutment means comprises an adjustment plate in adjustably secured relationship with said outer telescoping housing adjacent to said bearing blocks and between said ratchet means and said steering gear, said plate being adapted to engage with said bearing block to limit movement of said housing towards an extended position.

References Cited in the file of this patent

UNITED STATES PATENTS 2,079,536     Thurber _____ May 4, 1937
2,511,165     Lyman _____ June 13, 1950